(12) United States Patent
Bae

(10) Patent No.: US 11,190,040 B2
(45) Date of Patent: Nov. 30, 2021

(54) SHAPE OF WIRELESS POWER TRANSMISSION COIL AND COIL CONFIGURATION METHOD

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 210 days.

(21) Appl. No.: 16/312,902

(22) PCT Filed: May 24, 2017

(86) PCT No.: PCT/KR2017/005368
§ 371 (c)(1),
(2) Date: Dec. 21, 2018

(87) PCT Pub. No.: WO2018/004130
PCT Pub. Date: Jan. 4, 2018

(65) Prior Publication Data
US 2019/0148971 A1    May 16, 2019

(30) Foreign Application Priority Data

Jun. 30, 2016    (KR) .......................... 10-2016-0082224

(51) Int. Cl.
*H02J 7/00*    (2006.01)
*H02J 7/02*    (2016.01)
(Continued)

(52) U.S. Cl.
CPC ................ *H02J 7/025* (2013.01); *H02J 7/02* (2013.01); *H02J 50/12* (2016.02); *H02J 50/80* (2016.02); *H01F 27/28* (2013.01); *H01F 38/14* (2013.01)

(58) Field of Classification Search
CPC .... H02J 7/025; H02J 7/02; H02J 50/12; H02J 50/80; H02J 7/00034; H01F 27/28; H01F 38/14; H01F 27/2823; H04B 5/0037
See application file for complete search history.

(56) References Cited

U.S. PATENT DOCUMENTS 10,063,100 B2 *   8/2018   Singh ..................... H01F 38/14
2013/0241300 A1   9/2013   Miyamoto
(Continued)

FOREIGN PATENT DOCUMENTS

KR    10-2013-0072284 A    7/2013
KR    10-2015-0035512 A    4/2015
(Continued)

OTHER PUBLICATIONS

"http://www.heating.co.kr/data3.htm/", 3 pages total, date retrieved Oct. 16, 2018.

*Primary Examiner* — Jack Chiang
*Assistant Examiner* — Brandon Bowers
(74) *Attorney, Agent, or Firm* — Birch, Stewart, Kolasch & Birch, LLP

(57) ABSTRACT

An electromagnetic resonance-type wireless power transmitter according to one embodiment of the present invention may comprise: a power conversion unit including a converter capable of converting a voltage received from a power supply unit into a particular voltage; a power transmission unit including a wireless power transmission coil for receiving the particular voltage from the power conversion unit and wirelessly transmitting power, using a particular resonance frequency; a communication unit capable of performing data communication with a wireless power receiver; and a control unit for controlling the power conversion unit, the power transmission unit, and the communication unit, wherein the wireless power transmission coil may comprise an outer coil part having a first loop shape, and an inner coil (Continued)

part disposed within the first loop shape and having a second loop shape, the direction of a current flowing through the outer coil part may be opposite to that of a current flowing through the inner coil part adjacent to the outer coil part, and the direction of a magnetic field generated by the outer coil part may be identical to that of a magnetic field generated by the inner coil part in a first area between the outer coil part and the inner coil part adjacent to the outer coil part.

7 Claims, 11 Drawing Sheets

(51) Int. Cl.
*H02J 50/12* (2016.01)
*H02J 50/80* (2016.01)
*H01F 27/28* (2006.01)
*H01F 38/14* (2006.01)

(56) References Cited

U.S. PATENT DOCUMENTS

| | | |
|---|---|---|
| 2014/0143933 A1 | 5/2014 | Low et al. |
| 2014/0339906 A1 | 11/2014 | Miyamoto et al. |
| 2014/0339907 A1 | 11/2014 | Omae et al. |
| 2015/0054350 A1 | 2/2015 | Covic et al. |
| 2015/0054457 A1 | 2/2015 | Kim |
| 2015/0255987 A1 | 9/2015 | Yang et al. |
| 2015/0302983 A1 | 10/2015 | Park et al. |
| 2017/0054320 A1* | 2/2017 | Yamanishi ............... B60R 11/02 |
| 2019/0173325 A1* | 6/2019 | Ichikawa ............... H01F 27/346 |

FOREIGN PATENT DOCUMENTS

| | | |
|---|---|---|
| KR | 10-2015-0090179 A | 8/2015 |
| WO | WO 2013/141620 A1 | 9/2013 |
| WO | WO 2014/109460 A1 | 7/2014 |
| WO | WO 2015/167099 A1 | 11/2015 |

* cited by examiner

SHAPE OF WIRELESS POWER TRANSMISSION COIL AND COIL CONFIGURATION METHOD

CROSS REFERENCE TO RELATED APPLICATIONS

This application is the National Phase of PCT International Application No. PCT/KR2017/005368, filed on May 24, 2017, which claims priority under 35 U.S.C. 119(a) to Patent Application No. 10-2016-0082224, filed in the Republic of Korea on Jun. 30, 2016, all of which are hereby expressly incorporated by reference into the present application.

TECHNICAL FIELD

Embodiments relate to wireless power transmission, and more particularly to a method of arranging a wireless power transmission coil.

BACKGROUND ART

A portable terminal, such as a mobile phone or a laptop computer, includes a battery for storing power and a circuit for charging and discharging the battery. In order to charge the battery, power from an external charger is supplied to the terminal.

In general, as an example of electrical connection between a battery and a charging device for charging the battery, there may be provided a terminal supply scheme in which the charging device receives commercial power, converts the received power into voltage and current corresponding to the battery, and supplies electrical energy to the battery through a terminal of the battery. The terminal supply scheme is accompanied by the use of a physical cable or an electrical wire. In the case in which a large number of terminal supply type devices are used, therefore, a large number of cables occupy a considerably large work space, are difficult to arrange, and have a poor appearance. Also, in the terminal supply scheme, instantaneous discharging of the battery due to a potential difference between terminals, burning damage to the battery due to foreign matter, the occurrence of a fire due to foreign matter, self discharge of the battery, and a reduction in the lifespan and performance of the battery may be caused.

In order to solve these problems, a charging system using a wireless power transmission scheme (hereinafter, referred to as a "wireless charging system") and methods of controlling the same have been suggested in recent years. In the past, the demand for the wireless charging system was low, since some portable terminals were not basically provided with the wireless charging system, and therefore it was necessary for consumers to additionally purchase wireless charging receiver accessories. However, it is expected that the number of wireless charging users will rapidly increase and that terminal manufacturers will basically provide a wireless charging function from now on.

In general, the wireless charging system includes a wireless power transmitter for supplying electrical energy using a wireless power transmission scheme and a wireless power receiver for charging a battery using the electrical energy received from the wireless power transmitter.

The wireless charging system may transmit power using at least one wireless power transmission scheme (for example, an electromagnetic induction scheme, an electromagnetic resonance scheme, or an RF wireless power transmission scheme).

In an example, various wireless power transmission standards based on an electromagnetic induction scheme, in which charging is performed using the electromagnetic induction principle, by which a magnetic field is generated at a power-transmission-end coil and electricity is induced at a power-reception-end coil due to the magnetic field, may be used as the wireless power transmission scheme. Here, the electromagnetic-induction-type wireless power transmission standards may include electromagnetic-induction-type wireless charging technology defined by WPC (Wireless Power Consortium) and/or PMA (Power Matters Alliance).

In another example, an electromagnetic resonance scheme, in which a magnetic field generated by a transmission coil of a wireless power transmitter is tuned to a specific resonance frequency to transmit power to a wireless power receiver located a short distance away, may be used as the wireless power transmission scheme. Here, the electromagnetic resonance scheme may include resonance-type wireless charging technology defined by A4WP (Alliance for Wireless Power), which is a wireless charging technology standards organization.

In a further example, an RF wireless power transmission scheme, in which low-power energy is loaded in an RF signal to transmit power to a wireless power receiver located a long distance away, may be used as the wireless power transmission scheme.

The wireless charging system may be designed to support at least two of the electromagnetic induction scheme, the electromagnetic resonance scheme, and the RF wireless power transmission scheme. In other words, the wireless charging system may be designed such that a wireless power transmitter transmits power to a wireless power receiver through a plurality of wireless power transmission schemes.

Meanwhile, the area of a region in which wireless power transmission is possible may be dependent on the number of wireless power transmission coils, and a plurality of wireless power transmission coils may be used in a wireless power transmitter in order to widen a wireless power transmission region. A wireless power transmitter including a plurality of wireless power transmission coils may charge a plurality of portable terminals using a wide power transmission region.

Although a wider charging area is provided when using a plurality of wireless power transmission coils than when using a single wireless power transmission coil, uniform power transmission must be performed across a wide wireless charging area irrespective of the position of wireless power receivers.

Therefore, there is a necessity for a method of effectively arranging a plurality of wireless power transmission coils such that uniform power is transmitted to wireless power receivers.

DISCLOSURE

Technical Problem

Therefore, the present disclosure has been made in view of the above problems, and embodiments provide the shape of a wireless power transmission coil and a method of arranging the coil.

Embodiments relate to the shape of a wireless power transmission coil, and provide the shape of a wireless power transmission coil that transmits uniform power to wireless power receivers in a region in which wireless power transmission is possible irrespective of the position of the wireless power receivers in the case in which the wireless power transmission coils are used and a method of arranging the coil.

The technical objects that can be achieved through the embodiments are not limited to what has been particularly described hereinabove, and other technical objects not described herein will be more clearly understood by persons skilled in the art from the following detailed description.

Technical Solution

In one embodiment, an electromagnetic-resonance-type wireless power transmitter may include a power conversion unit including a converter for converting voltage received from a power supplier into specific voltage, a transmission resonator including a wireless power transmission coil for wirelessly transmitting power using a specific resonance frequency based on the specific voltage from the power conversion unit, a matching circuit for matching impedance between the transmission resonator and the power conversion unit, a communication unit for performing data communication with a wireless power receiver, and a controller for controlling the power conversion unit, the transmission resonator, and the communication unit, wherein the wireless power transmission coil may include a plurality of coil pairs, each of which includes two coils, in which current flows in opposite directions, the coils being spaced apart from each other by a first distance, wherein the coil pairs may be spaced apart from each other by a second distance, and wherein the first distance and the second distance may be determined based on the magnitude of current flowing in each coil pair.

In some embodiments, the first distance and the second distance may increase in proportion to the minimum magnitude of the current flowing in each coil pair.

In another embodiment, an electromagnetic-resonance-type wireless power transmission coil may include a plurality of coil pairs, each of which includes two coils, in which current flows in opposite directions, the coils being spaced apart from each other by a first distance, wherein the coil pairs may be spaced apart from each other by a second distance, and wherein the first distance and the second distance may be determined based on the magnitude of current flowing in each coil pair.

In some embodiments, the first distance and the second distance may increase in proportion to the minimum magnitude of the current flowing in each coil pair.

In another embodiment, an electromagnetic-resonance-type wireless power transmission coil may include an outer coil wound and disposed such that current flows in a first direction, an inner coil disposed inside the outer coil, the inner coil being wound and disposed such that current flows in a direction opposite the first direction, and a connection unit for connecting the outer coil and the inner coil in series or in parallel, wherein the distance between the inner coil and the outer coil may be determined based on the magnitude of current flowing in the outer coil and the inner coil.

In some embodiments, the distance may increase in proportion to the minimum magnitude of current flowing in the outer coil and the inner coil.

In some embodiments, when the connection unit connects the outer coil and the inner coil in series, the outer coil and the inner coil may form a single loop.

In another embodiment, an electromagnetic-resonance-type wireless power transmission coil may include (N+1) coil pairs, each of which includes a pair of coils wound and disposed such that current flows in opposite directions, wherein the coils of each coil pair are disposed so as to be spaced apart from each other by a first distance, wherein an (N+1)-th coil pair and an N-th coil pair are disposed so as to be spaced apart from each other by a second distance, and wherein the first distance and the second distance may be determined based on the magnitude of current flowing in each coil pair.

In some embodiments, the first distance and the second distance may increase in proportion to the minimum magnitude of the current flowing in each coil pair.

In another embodiment, an electromagnetic-resonance-type wireless power transmission coil may include an N-th coil wound and disposed in an N-th order such that current flows in a first direction, an (N+1)-th coil disposed outside the N-th coil, the (N+1)-th coil being wound and disposed such that current flows in a direction opposite the first direction, and a connection unit for connecting the N-th coil and the (N+1)-th coil in series or in parallel, wherein the distance between the N-th coil and the (N+1)-th coil may be determined based on the magnitude of current flowing in the N-th coil and the (N+1)-th coil.

In some embodiments, the distance between the N-th coil and the (N+1)-th coil may increase in proportion to the minimum magnitude of the current flowing in the N-th coil and the (N+1)-th coil.

In a further embodiment, an electromagnetic-resonance-type wireless power transmitter may include a power conversion unit including a converter for converting voltage received from a power supplier into specific voltage, a power transmission unit including a wireless power transmission coil for wirelessly transmitting power using a specific resonance frequency based on the specific voltage from the power conversion unit, a communication unit for performing data communication with a wireless power receiver, and a controller for controlling the power conversion unit, the power transmission unit, and the communication unit, wherein the wireless power transmission coil may include an outer coil unit having a first loop shape and an inner coil unit having a second loop shape, the inner coil unit being disposed in the first loop shape, wherein the direction of current flowing in the outer coil unit may be opposite the direction of current flowing in the inner coil unit, which is adjacent to the outer coil unit, and wherein the direction of a magnetic field generated by the outer coil unit and the direction of a magnetic field generated by the inner coil unit are identical in a first region between the outer coil unit and the inner coil unit, which is adjacent to the outer coil unit.

In some embodiments, the outer coil unit and the inner coil unit, which is adjacent to the outer coil unit, may be spaced apart from each other by a first distance, and the first distance may be determined based on the magnitude of current flowing in the power transmission unit.

In some embodiments, a first end of the outer coil unit may be connected to the power conversion unit, a second end of the outer coil unit may be connected to a first end of the inner coil unit, and a second end of the inner coil unit may be connected to the power conversion unit.

In some embodiments, the current flowing in the outer coil unit may flow from the first end of the outer coil unit to the second end of the outer coil unit, and the current flowing in the inner coil unit may flow from the first end of the inner coil unit to the second end of the inner coil unit.

In some embodiments, the first end of the outer coil unit and the second end of the inner coil unit may be disposed so as to be adjacent to each other.

In some embodiments, the outer coil unit and the inner coil unit may be connected in parallel.

In some embodiments, the first end and the second end of the outer coil unit may be connected to the power conversion unit, the first end of the inner coil unit may be connected to the first end of the outer coil unit, and the second end of the inner coil unit may be connected to the power conversion unit.

In some embodiments, the current flowing in the outer coil unit may flow from the first end of the outer coil unit to the second end of the outer coil unit, and the current flowing in the inner coil unit may flow from the first end of the inner coil unit to the second end of the inner coil unit.

In some embodiments, the first distance and the second distance may increase in proportion to the minimum magnitude of the current flowing in each coil pair.

Advantageous Effects

A wireless power transmission scheme switching method and device according to embodiments have the following effects.

First, it is possible to transmit power to several wireless power receivers simultaneously using a plurality of wireless power transmission coils.

Second, it is possible to appropriately arrange a plurality of wireless power transmission coils, thereby uniformly performing wireless power transmission throughout a region.

Third, it is possible to appropriately arrange wireless power transmission coils in consideration of the distance between the coils, thereby reducing raw material costs.

Fourth, it is possible to arrange a plurality of wireless power transmission coils such that magnetic fields generated by the coils are not offset, thereby reducing the amount of power used during wireless power transmission.

It will be appreciated by those skilled in the art that that effects that can be achieved through the embodiments of the present disclosure are not limited to those described above and other effects of the present disclosure will be more clearly understood from the following detailed description.

DESCRIPTION OF DRAWINGS

The accompanying drawings, which are included to provide a further understanding of the disclosure and are incorporated in and constitute a part of this application, illustrate embodiments of the disclosure and, together with the description, serve to explain the principles of the disclosure. It is to be understood, however, that the technical features of the present disclosure are not limited to the specific drawings, and the features disclosed in the drawings may be combined to constitute a new embodiment. In the drawings.

BEST MODE

Figure 1:
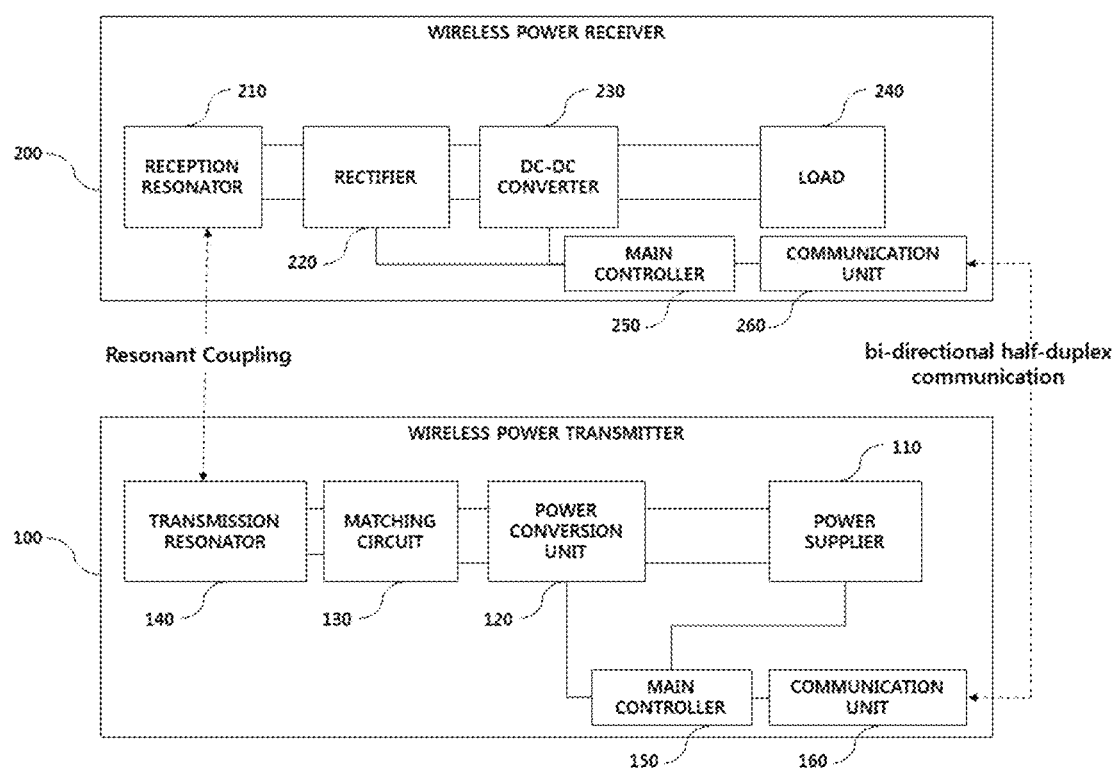
FIG. 1 is a block diagram illustrating the structure of an electromagnetic-resonance-type wireless power transmission system according to an embodiment.

An electromagnetic-resonance-type wireless power transmitter according to an embodiment may include a power conversion unit including a converter for converting voltage received from a power supplier into specific voltage, a transmission resonator including a wireless power transmission coil for wirelessly transmitting power using a specific resonance frequency based on the specific voltage from the power conversion unit, a matching circuit for matching impedance between the transmission resonator and the power conversion unit, a communication unit for performing data communication with a wireless power receiver, and a controller for controlling the power conversion unit, the transmission resonator, and the communication unit, wherein the wireless power transmission coil may include a plurality of coil pairs, each of which includes two coils, in which current flows in opposite directions, the coils being spaced apart from each other by a first distance, wherein the coil pairs may be spaced apart from each other by a second distance, and wherein the first distance and the second distance may be determined based on the magnitude of current flowing in each coil pair.

Mode for Invention

Hereinafter, a device and various methods to which embodiments are applied will be described in detail with reference to the drawings. As used herein, the suffixes "module" and "unit" are added or used interchangeably to facilitate preparation of this specification and are not intended to suggest distinct meanings or functions.

While all elements constituting embodiments of the present disclosure are described as being connected into one body or operating in connection with each other, the disclosure is not limited to the described embodiments. That is, within the scope of the present disclosure, one or more of the elements may be selectively connected to operate. In addition, although all elements can be implemented as one independent hardware device, some or all of the elements may be selectively combined to implement a computer program having a program module for executing some or all of the functions combined in one or more hardware devices. Code and code segments that constitute the computer program can be easily inferred by those skilled in the art. The computer program may be stored in a computer-readable storage medium, which is read and executed by a computer to implement an embodiment of the present disclosure. The storage medium of the computer program may include a magnetic recording medium, an optical recording medium, and a carrier wave medium.

In the description of the embodiments, it is to be understood that when an element is described as being "on" or "under" and "before" or "after" another element, it can be directly "on" or "under" and "before" or "after" the other element, or can be indirectly formed such that one or more other intervening elements are also present between the two elements.

The terms "include," "comprise" and "have" should be understood as not precluding the possibility of existence or addition of one or more other components unless otherwise stated. All terms, including technical and scientific terms, have the same meanings as those commonly understood by one of ordinary skill in the art to which this disclosure pertains, unless otherwise defined. Commonly used terms, such as those defined in typical dictionaries, should be interpreted as being consistent with the contextual meaning of the relevant art, and are not to be construed in an ideal or overly formal sense unless expressly defined to the contrary.

In describing the components of the present disclosure, terms such as "first," "second," "A," "B," "(a)," and "(b)" may be used. These terms are used only for the purpose of distinguishing one constituent from another, and the terms do not limit the nature, order or sequence of the components. When one component is said to be "connected," "coupled" or "linked" to another, it should be understood that this means the one component may be directly connected or linked to the other one, or that yet another component may be interposed between the components.

In the description of the embodiments, a detailed description of related known technologies and the like will be omitted when it is judged to make the subject matter of the disclosure unclear.

In the description of the embodiments, "wireless power transmitter," "wireless power transmission device," "transmission terminal," "transmitter," "transmission device," "transmission side," "wireless charging device," and the like will be used interchangeably to refer to a device for transmitting wireless power in a wireless power charging system, for the convenience of description. In addition, "wireless power reception device," "wireless power receiver," "reception terminal," "reception side," "reception device," "receiver," and the like will be used interchangeably to refer to a device for receiving wireless power from a wireless power transmission device, for the convenience of description.

A wireless charging device according to an embodiment may be configured as a pad type, a cradle type, an access-point (AP) type, a small base-station type, a stand type, a ceiling-embedded type, a wall-mounted type, or the like. One transmitter may transmit power to a plurality of wireless power reception devices.

For example, a wireless power transmitter may be used in the state of being placed on a desk or a table, or may be developed for vehicles so as to be used in vehicles. A wireless power transmitter for vehicles may be configured as a cradle type so as to be conveniently and stably fixed and held in a vehicle.

A terminal according to an embodiment may be embedded in small-sized electronic devices such as a mobile phone, a smartphone, a laptop computer, a digital broadcast terminal, a PDA (Personal Digital Assistant), a PMP (Portable Multimedia Player), a navigation system, an MP3 player, an electric toothbrush, an electronic tag, a lighting device, a remote controller, and a fishing float. However, the disclosure is not limited thereto. The terminal may be applied to any mobile device (hereinafter, referred to as a "device") which may be provided with a wireless power receiving means according to an embodiment, through which a battery thereof may be charged. The terms "terminal" and "device" may be used interchangeably. A wireless power receiver according to another embodiment may be mounted on a vehicle, an unmanned aerial vehicle, a drone, and the like.

A wireless power receiver according to an embodiment may be provided with at least one wireless power transmission scheme, and may simultaneously receive wireless power from two or more wireless power transmitters. Here, the wireless power transmission scheme may include at least one of the electromagnetic induction scheme, the electromagnetic resonance scheme, or the RF wireless power transmission scheme.

In general, a wireless power transmitter and a wireless power receiver constituting a wireless power system may exchange a control signal or information with each other through in-band communication or BLE (Bluetooth Low Energy) communication. Here, the in-band communication or the BLE communication may be performed based on a pulse-width-modulation scheme, a frequency-modulation scheme, a phase-modulation scheme, an amplitude-modulation scheme, or an amplitude- and phase-modulation scheme. For example, the wireless power receiver may switch ON/OFF current induced through a reception coil in a predetermined pattern to generate a feedback signal, whereby the wireless power receiver may transmit various control signals and information to the wireless power transmitter. The information transmitted by the wireless power receiver may include various kinds of state information including information about the intensity of reception power. At this time, the wireless power transmitter may calculate charging efficiency or power transmission efficiency based on the information about the intensity of reception power.

In another example, the wireless power transmitter may be designed to support at least two of the electromagnetic induction scheme, the electromagnetic resonance scheme, and the RF wireless power transmission scheme.

Hereinafter, the electromagnetic resonance scheme, which is one of the wireless power transmission schemes, will be described with reference to FIGS. 1 to 6, and the arrangement of an electromagnetic-resonance-type wireless power transmission coil will be described with reference to FIGS. 7 to 11.

FIG. 1 is a block diagram illustrating the structure of a wireless power transmission system according to an embodiment.

Referring to FIG. 1, the wireless power transmission system may include a wireless power transmitter 100 and a wireless power receiver 200.

In FIG. 1, the wireless power transmitter 100 is shown as transmitting wireless power to a single wireless power receiver 200, which, however, is merely an embodiment. In another embodiment, a wireless power transmitter 100 may transmit wireless power to a plurality of wireless power receivers 200. In a further embodiment, a wireless power receiver 200 may receive wireless power simultaneously from a plurality of wireless power transmitters 100.

The wireless power transmitter 100 may generate a magnetic field using a specific power transmission frequency to transmit power to the wireless power receiver 200.

The wireless power receiver 200 may be tuned at a frequency identical to that used by the wireless power transmitter 100 in order to receive power.

For example, a frequency for power transmission may be 6.78 MHz. However, the disclosure is not limited thereto.

That is, power transmitted by the wireless power transmitter 100 may be transmitted to the wireless power receiver 200, which resonates with the wireless power transmitter 100.

The maximum number of wireless power receivers 200 that are capable of receiving power from a single wireless power transmitter 100 may be set based on the maximum power transmission level of the wireless power transmitter 100, the maximum power reception level of each of the wireless power receivers 200, and the physical structures of the wireless power transmitter 100 and the wireless power receivers 200.

The wireless power transmitter 100 and the wireless power receiver 200 may perform bidirectional communication therebetween at a frequency band different from a frequency band for wireless power transmission, i.e. a resonance frequency band. For example, a half-duplex-type BLE (Bluetooth Low Energy) communication protocol may be used for bidirectional communication.

The wireless power transmitter 100 and the wireless power receiver 200 may exchange their characteristics and state information, i.e. power negotiation information, with each other for bidirectional communication.

For example, the wireless power receiver 200 may transmit predetermined power reception state information, for controlling the level of power received from the wireless power transmitter 100, to the wireless power transmitter 100 through bidirectional communication, and the wireless power transmitter 100 may dynamically control the level of transmission power based on the received power reception state information. As a result, the wireless power transmitter 100 may provide a function of optimizing power transmission efficiency, a function of preventing damage to a load due to overvoltage, and a function of preventing useless waste of power due to under-voltage.

In addition, the wireless power transmitter 100 may perform a function of authenticating and identifying the wireless power receiver 200 through bidirectional communication, a function of identifying an object that is not compatible or cannot be charged, and a function of identifying an effective load.

Hereinafter, a resonance-type wireless power transmission procedure will be described in more detail with reference to FIG. 1.

The wireless power transmitter 100 may include a power supplier 110, a power conversion unit 120, a matching circuit 130, a transmission resonator 140, a main controller 150, and a communication unit 160. The communication unit may include a data transmitter and a data receiver.

The power supplier 110 may supply specific supply voltage to the power conversion unit 120 under the control of the main controller 150. At this time, the supply voltage may be DC voltage or AC voltage.

The power conversion unit 120 may convert the voltage received from the power supplier 110 into specific voltage under the control of the main controller 150. To this end, the power conversion unit 120 may include at least one of a DC/DC converter, an AC/AC converter, or a power amplifier.

The matching circuit 130 is a circuit that matches impedance between the power conversion unit 120 and the transmission resonator 140 in order to maximize power transmission efficiency.

The transmission resonator (or power transmission unit) 140 may wirelessly transmit power using a specific resonance frequency based on the voltage applied from the matching circuit 130. The transmission resonator 140 may include a wireless power transmission coil, and may wirelessly transmit induced voltage, generated by current flowing in the wireless power transmission coil, using a specific resonance frequency.

The wireless power receiver 200 may include a reception resonator 210, a rectifier 220, a DC-DC converter 230, a load 240, a main controller 250, and a communication unit 260. The communication unit may include a data transmitter and a data receiver.

The reception resonator 210 may receive power transmitted from the transmission resonator 140 through a resonance phenomenon.

The rectifier 220 may perform a function of converting AC voltage, applied from the reception resonator 210, into DC voltage.

The DC-DC converter 230 may convert the rectified DC voltage into specific DC voltage required by the load 240.

The main controller 250 may control the operation of the rectifier 220 and the DC-DC converter 230, or may generate characteristics and state information of the wireless power receiver 200, and may control the communication unit 260 to transmit the characteristics and state information of the wireless power receiver 200 to the wireless power transmitter 100. For example, the main controller 250 may monitor the intensity of voltage and current output from the rectifier 220 and the DC-DC converter 230 to control the operation of the rectifier 220 and the DC-DC converter 230.

Information about the monitored intensity of output voltage and current may be transmitted to the wireless power transmitter 100 through the communication unit 260 in real time.

In addition, the main controller 250 may compare the rectified DC voltage with a predetermined reference voltage to determine whether the current state is an overvoltage state or an under-voltage state, and, when a system error state is sensed depending on the result of the determination, may transmit the result of sensing to the wireless power transmitter 100 through the communication unit 260.

In addition, when a system error state is sensed, the main controller 250 may control the operation of the rectifier 220 and the DC-DC converter 230, or may control the supply of power to the load 240 using a predetermined overcurrent interruption circuit including a switch and/or a Zener diode in order to prevent damage to the load.

In FIG. 1, the main controller 150 or 250 and the communication unit 150 or 260 are shown as being constituted as different modules, which, however, is merely an embodiment. In another embodiment, the main controller 150 or 250 and the communication unit 150 or 260 may be constituted as a single module.

Figure 2:
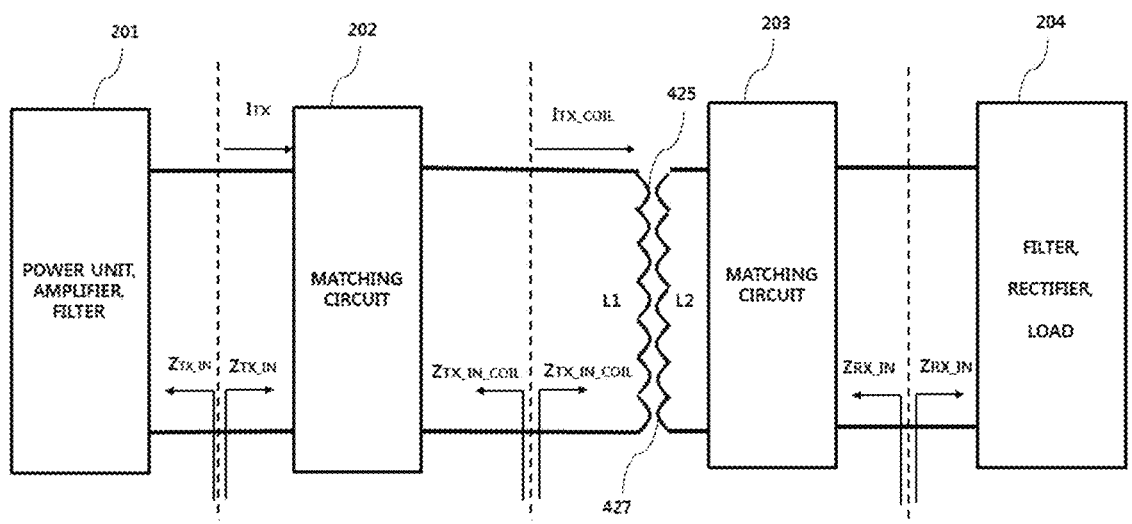
FIG. 2 is an equivalent circuit diagram of the electromagnetic-resonance-type wireless power transmission system according to the embodiment.

FIG. 2 is an equivalent circuit diagram of the electromagnetic-resonance-type wireless power transmission system according to the embodiment.

Specifically, FIG. 2 shows interface points on an equivalent circuit at which reference parameters, which will be described below, are measured.

Hereinafter, the meanings of the reference parameters shown in FIG. 2 will be described briefly.

$I_{TX}$ and $I_{TX\_COIL}$ mean RMS (Root Mean Square) current supplied to a matching circuit (or matching network) 220 of the wireless power transmitter and RMS current supplied to a transmission resonator coil 225 of the wireless power transmitter, respectively.

$Z_{TX\_IN}$ and $Z_{TX\_IN\_COIL}$ mean input impedance at the front end of the matching circuit 220 of the wireless power transmitter and input impedance at the rear end of the matching circuit 220 and at the front end of the transmission resonator coil 225, respectively.

L1 and L2 mean an inductance value of the transmission resonator coil 225 and an inductance value of a reception resonator coil 227, respectively.

$Z_{RX\_IN}$ means input impedance at the rear end of a matching circuit 230 of the wireless power receiver and at the front end of a filter/rectifier/load 240.

The resonance frequency used to operate the wireless power transmission system according to the embodiment may be 6.78 MHz±15 KHz.

Also, in the wireless power transmission system according to the embodiment, a plurality of wireless power receivers may be simultaneously charged, i.e. multi-charging of the wireless power receivers may be possible. In this case, even when a new wireless power receiver is added or when one of the existing wireless power receivers is removed, control may be performed such that variation in the power received by the wireless power receivers does not exceed a predetermined reference value. For example, variation in reception power may be ±10%. However, the disclosure is not limited thereto.

In order to maintain the variation in reception power, when a wireless power receiver is added in or removed from a charging area, the added wireless power receiver must not overlap the existing wireless power receivers.

In the case in which the matching circuit 230 of the wireless power receiver is connected to the rectifier, a real part of $Z_{TX\_IN}$ may be in an inverse relationship with load resistance of the rectifier (hereinafter, referred to as $R_{RECT}$). That is, $Z_{TX\_IN}$ may decrease when $R_{RECT}$ increases, and $Z_{TX\_IN}$ may increase when $R_{RECT}$ decreases.

Resonator coupling efficiency according to an embodiment may be the maximum power reception rate calculated by dividing the power transmitted to the load 240 from the reception resonator coil by the power loaded into the resonance frequency band from the transmission resonator coil 225. The resonator coupling efficiency between the wireless power transmitter and the wireless power receiver may be calculated in the case in which the reference port impedance $Z_{TX\_IN}$ of the transmission resonator and the reference port impedance $Z_{RX\_IN}$ of the reception resonator are completely matched with each other.

Table 1 shows an example of minimum resonator coupling efficiency based on the class of a wireless power transmitter and the category of a wireless power receiver according to an embodiment.

TABLE 1

|  | Category 1 | Category 2 | Category 3 | Category 4 | Category 5 | Category 6 | Category 7 |
|---|---|---|---|---|---|---|---|
| Class 1 | N/A | N/A | N/A | N/A | N/A | N/A | N/A |
| Class 2 | N/A | 74% (−1.3) | 74% (−1.3) | N/A | N/A | N/A | N/A |
| Class 3 | N/A | 74% (−1.3) | 74% (−1.3) | 76% (−1.2) | N/A | N/A | N/A |
| Class 4 | N/A | 50% (−3) | 65% (−1.9) | 73% (−1.4) | 76% (−1.2) | N/A | N/A |
| Class 5 | N/A | 40% (−4) | 60% (−2.2) | 63% (−2) | 73% (−1.4) | 76% (−1.2) | N/A |
| Class 6 | N/A | 30% (−5.2) | 50% (−3) | 54% (−2.7) | 63% (−2) | 73% (−1.4) | 76% (−1.2) |

In the case in which a plurality of wireless power receivers is used, the minimum resonator coupling efficiency corresponding to the class and category shown in Table 1 may increase.

Figure 3:
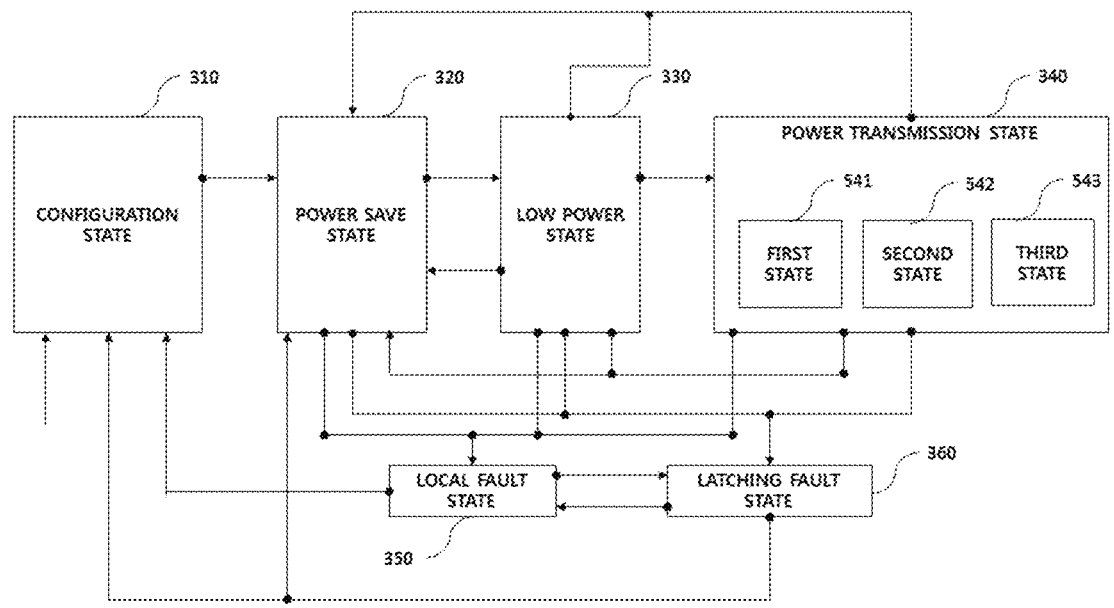
FIG. 3 is a state transition view illustrating a state transition procedure in an electromagnetic-resonance-type wireless power transmitter according to an embodiment.

FIG. 3 is a state transition view illustrating a state transition procedure in an electromagnetic-resonance-type wireless power transmitter according to an embodiment.

Referring to FIG. 3, the state of the wireless power transmitter may mainly include a configuration state 310, a power save state 320, a low power state 330, a power transfer state 340, a local fault state 350, and a latching fault state 360.

When power is supplied to the wireless power transmitter, the wireless power transmitter may be transited to the configuration state 310. When the operation of a predetermined reset timer is completed or an initialization procedure is completed, the wireless power transmitter may be transited to the power save state 320.

In the power save state 320, the wireless power transmitter may generate a beacon sequence, and may transmit the generated beacon sequence through a resonance frequency band.

Here, the wireless power transmitter may be controlled such that the beacon sequence starts within a predetermined time after entering the power save state 320. For example, the wireless power transmitter may be controlled such that the beacon sequence starts within 50 ms after transition to the power save state 320. However, the disclosure is not limited thereto.

In the power save state 320, the wireless power transmitter may periodically generate and transmit a first beacon sequence for sensing the wireless power receiver, and may sense variation in the impedance of the reception resonator, i.e. load variation. Hereinafter, a first beacon and a first beacon sequence will be referred to as a short beacon and a short beacon sequence for the convenience of description.

In particular, the short beacon sequence may be repeatedly generated and transmitted during a short period $t_{SHORT\_BEACON}$ at predetermined intervals $t_{CYCLE}$ such that standby power of the wireless power transmitter can be saved until the wireless power receiver is sensed. For example, $t_{SHORT\_BEACON}$ may be set to 30 ms or less, and $t_{CYCLE}$ may be set to 250 ms±5 ms. In addition, the intensity of current of the short beacon may be a predetermined reference value or more, and may gradually increase during a predetermined time period. For example, the minimum intensity of current of the short beacon may be set large enough so that a wireless power receiver belonging to Category 2 or higher in Table 2 can be sensed.

The wireless power transmitter according to the embodiment may include a predetermined sensing means for sensing variation in reactance and resistance at the reception resonator based on the short beacon.

Also, in the power save state 320, the wireless power transmitter may periodically generate and transmit a second beacon sequence for supplying sufficient power necessary for booting and response of the wireless power receiver. Hereinafter, a second beacon and a second beacon sequence will be referred to as a long beacon and a long beacon sequence for the convenience of description.

That is, when the booting of the wireless power receiver is completed through the second beacon sequence, the wireless power receiver may broadcast a predetermined response signal through an out-of-band communication channel.

In particular, the long beacon sequence may be generated and transmitted during a long period $t_{LONG\_BEACON}$ at predetermined intervals $t_{LONG\_BEACON\_PERIOD}$, which is longer than the case of the short beacon, in order to supply sufficient power to boot the wireless power receiver. For example, $t_{LONG\_BEACON}$ may be set to 105 ms+5 ms, and $t_{LONG\_BEACON\_PERIOD}$ may be set to 850 ms. The intensity of current of the long beacon may be higher than the intensity of current of the short beacon. In addition, a uniform intensity of power may be maintained during the transmission period of the long beacon.

Subsequently, after variation in the impedance of the reception resonator is sensed, the wireless power transmitter may wait for the reception of a predetermined response signal during the transmission period of the long beacon. Hereinafter, the response signal will be referred to as an advertisement signal for the convenience of description. Here, the wireless power receiver may broadcast the advertisement signal through an out-of-band communication frequency band, which is different from the resonance frequency band.

For example, the advertisement signal may include at least one of message identification information for identifying a message defined in a corresponding out-of-band communication standard, inherent service or wireless power receiver identification information for identifying whether a wireless power receiver is a legal receiver or a receiver compatible with a corresponding wireless power transmitter, information about power output from a wireless power receiver, information about rated voltage/current applied to a load, information about antenna gain of a wireless power receiver, information for identifying a category of a wireless power receiver, authentication information of a wireless power receiver, information about whether an overvoltage protection function is provided, or version information of software provided in a wireless power receiver, or may include any one thereof.

Upon receiving the advertisement signal, the wireless power transmitter may be transited from the power save state 320 to the low power state 330, and may establish an out-of-band communication link with the wireless power receiver. Subsequently, the wireless power transmitter may perform a registration procedure for the wireless power receiver through the established out-of-band communication link. For example, in the case in which the out-of-band communication is Bluetooth low-power communication, the wireless power transmitter may perform Bluetooth pairing with the wireless power receiver, and the wireless power transmitter and the wireless power receiver may exchange at least one of their state information, characteristic information, or control information through the paired Bluetooth link.

When the wireless power transmitter transmits a predetermined control signal for commencing charging, i.e. a predetermined control signal for requesting the wireless power receiver to transmit power to a load, to the wireless power receiver through the out-of-band communication, the wireless power transmitter may be transited from the low power state 330 to the power transfer state 340.

In the case in which the out-of-band communication link establishment procedure or the registration procedure is not normally completed in the low power state 330, the wireless power transmitter may be transited from the low power state 330 to the power save state 320.

In the wireless power transmitter, an additional separate link expiration timer for connection with each wireless power receiver may be operated. The wireless power receiver must transmit a predetermined message announcing its presence to the wireless power transmitter at predetermined intervals before the operation of the link expiration timer is completed. The link expiration timer may be reset whenever the message is received. In the case in which the operation of the link expiration timer is not completed, the out-of-band communication link between the wireless power receiver and the wireless power transmitter may be maintained.

In the case in which the operation of the link expiration timer corresponding to the out-of-band communication link established between the wireless power transmitter and at least one wireless power receiver is completed in the low power state 330 or in the power transfer state 340, the wireless power transmitter may be transited to the power save state 320.

In addition, upon receiving an effective advertisement signal from the wireless power receiver, the wireless power transmitter in the low power state 330 may operate a predetermined registration timer. When the operation of the registration timer is completed, the wireless power transmitter in the low power state 330 may be transited to the power save state 320. At this time, the wireless power transmitter may output a predetermined notification signal providing notification of registration failure through a notification display means provided in the wireless power transmitter, such as an LED lamp, a display screen, or a beeper.

In addition, when charging of all of the wireless power receivers connected to the wireless power transmitter is completed in the power transfer state 340, the wireless power transmitter may be transited to the low power state 330.

In particular, the wireless power receiver may allow the registration of a new wireless power receiver in states other than the configuration state 310, the local fault state 350, and the latching fault state 360.

Also, in the power transfer state 340, the wireless power transmitter may dynamically control transmission power based on the state information received from the wireless power receiver.

At this time, receiver state information transmitted from the wireless power receiver to the wireless power transmitter may include at least one of required power information, information about voltage and/or current measured at the rear end of the rectifier, charging state information, information for providing notification of an overcurrent and/or overvoltage and/or overheating state, or information indicating whether a means for interrupting the transmission of power to the load or reducing the amount of power that is transmitted to the load depending on overcurrent or overvoltage has been activated. At this time, the receiver state information may be transmitted at predetermined cycles, or may be transmitted whenever a specific event is generated. In addition, the means for interrupting the transmission of power to the load or reducing the amount of power that is transmitted to the load depending on the overcurrent or the overvoltage may be provided using at least one of an ON/OFF switch or a Zener diode.

In another embodiment, the receiver state information transmitted from the wireless power receiver to the wireless power transmitter may further include information providing notification that an external power source has been connected to the wireless power receiver in a wired fashion or information providing notification that the out-of-band communication method has been changed, for example, from NFC (Near Field Communication) to BLE (Bluetooth Low Energy) communication.

In a further embodiment, the wireless power transmitter may adaptively set the intensity of power to be received by each wireless power receiver based on at least one of its own available power, priority of the wireless power receivers, or the number of wireless power receivers connected thereto. Here, the intensity of power to be received by each wireless power receiver may be set based on the ratio of the power to be received to the maximum power that can be processed by the rectifier of a corresponding wireless power receiver.

Subsequently, the wireless power transmitter may transmit a predetermined power control command including information about the set intensity of power to a corresponding wireless power receiver. At this time, the wireless power receiver may determine whether power control is possible using the intensity of power set by the wireless power transmitter, and may transmit the result of the determination to the wireless power transmitter through a predetermined power control response message.

In another embodiment, the wireless power receiver may transmit predetermined receiver state information indicating whether wireless power control is possible according to the power control command of the wireless power transmitter before receiving the power control command.

The power transfer state 340 may be one of a first state 341, a second state 342, and a third state 343 depending on the power reception state of the wireless power receiver connected to the wireless power transmitter.

For example, the first state 341 may be a state in which the power reception state of all wireless power receivers connected to the wireless power transmitter is a normal voltage state.

The second state 342 may be a state in which the power reception state of at least one wireless power receiver connected to the wireless power transmitter is a low voltage state and in which no wireless power receiver in a high voltage state exists.

The third state 343 may be a state in which the power reception state of at least one wireless power receiver connected to the wireless power transmitter is a high voltage state.

When a system error is sensed in the power save state 320, the low power state 330, or the power transfer state 340, the wireless power transmitter may be transited to the latching fault state 360.

Upon determining that all wireless power receivers connected to the wireless power transmitter have been removed from the charging area, the wireless power transmitter may be transited from the latching fault state 360 to the configuration state 310 or the power save state 320.

In addition, when a local fault is sensed, the wireless power transmitter may be transited from the latching fault state 360 to the local fault state 350. When the local fault is released, the wireless power transmitter may be transited from the local fault state 350 to the latching fault state 360.

In the case in which the wireless power transmitter is transited from one of the configuration state 310, the power save state 320, the low power state 330, and the power transfer state 340 to the local fault state 350, on the other hand, when the local fault is released, the wireless power transmitter may be transited from the local fault state 350 to the configuration state 310.

When the wireless power transmitter is transited to the local fault state 350, the supply of power to the wireless power transmitter may be interrupted. For example, when a fault, such as overvoltage, overcurrent, or overheating, is sensed, the wireless power transmitter may be transited to the local fault state 350. However, the disclosure is not limited thereto.

In one example, when overvoltage, overcurrent, or overheating is sensed, the wireless power transmitter may transmit a predetermined power control command for reducing the intensity of power that is received by the wireless power receiver to at least one wireless power receiver connected thereto.

In another example, when overcurrent, overvoltage, or overheating is sensed, the wireless power transmitter may transmit, to at least one connected wireless power receiver, a predetermined control command for stopping charging of the wireless power receiver.

Through the above-described power control procedure, the wireless power transmitter may prevent damage to the device due to overvoltage, overcurrent, overheating, or the like.

In the case in which the intensity of the output current of the transmission resonator is greater than or equal to a reference value, the wireless power transmitter may be transited to the latching fault state 360. The wireless power transmitter that has been transited to the latching fault state 360 may attempt to make the intensity of the output current of the transmission resonator less than or equal to a reference value for a predetermined time. Here, the attempt may be repeated a predetermined number of times. If the latching fault state 360 is not released despite repeated execution, the wireless power transmitter may send, to the user, a predetermined notification signal, indicating that the latching fault state 360 is not released, using a predetermined notification means. In this case, when all of the wireless power receivers positioned in the charging area of the wireless power transmitter are removed from the charging area by the user, the latching fault state 360 may be released.

On the other hand, if the intensity of the output current of the transmission resonator falls below the reference value within a predetermined time, or if the intensity of the output current of the transmission resonator falls below the reference value during the predetermined repetition, the latching fault state 360 may be automatically released. In this case, the wireless power transmitter may be automatically transited from the latching fault state 360 to the power save state 320 to perform the sensing and identification procedure for a wireless power receiver again.

The wireless power transmitter in the power transfer state 340 may transmit continuous power, and may adaptively control transmission power based on the state information of the wireless power receiver and predefined optimal voltage region setting parameters.

For example, the optimal voltage region setting parameters may include at least one of a parameter for identifying a low voltage region, a parameter for identifying an optimum voltage region, a parameter for identifying a high voltage region, or a parameter for identifying an overvoltage region.

The wireless power transmitter may increase transmission power in the case in which the power reception state of the wireless power receiver is in the low voltage region, and may reduce transmission power in the case in which the power reception state is in the high voltage region.

In addition, the wireless power transmitter may control transmission power to maximize power transmission efficiency.

In addition, the wireless power transmitter may control transmission power such that variation in the amount of power required by the wireless power receiver is less than or equal to a reference value.

In addition, the wireless power transmitter may stop transmitting power when the output voltage of the rectifier of the wireless power receiver reaches a predetermined overvoltage region, that is, when overvoltage is sensed.

Figure 4:
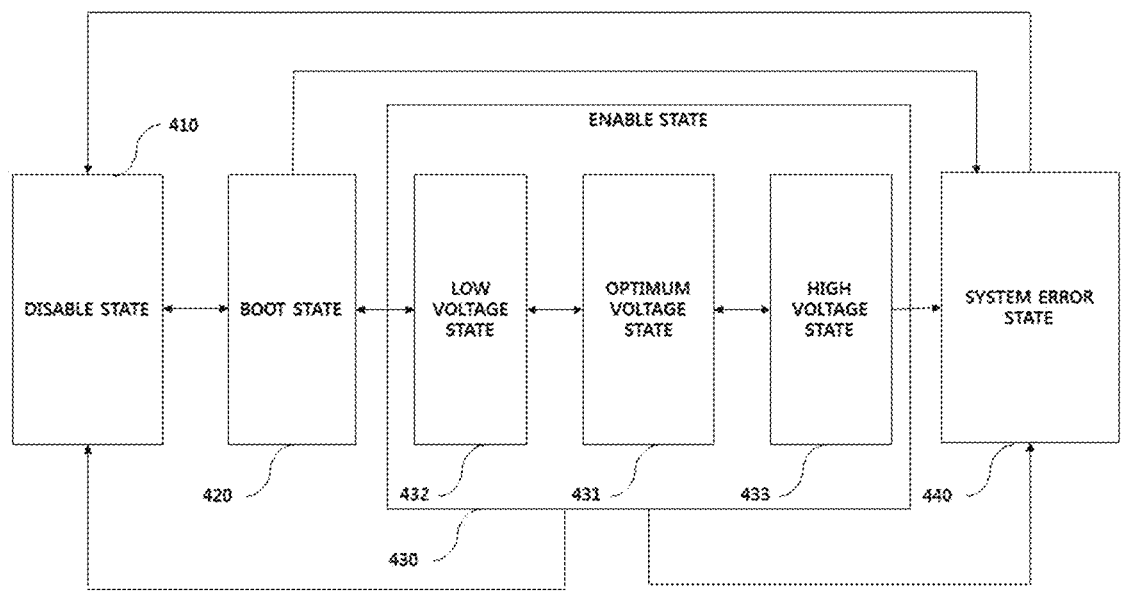
FIG. 4 is a state transition view of an electromagnetic-resonance-type wireless power receiver according to an embodiment.

FIG. 4 is a state transition view of an electromagnetic-resonance-type wireless power receiver according to an embodiment.

Referring to FIG. 4, the state of the wireless power receiver may generally include a disable state 410, a boot state 420, an enable state (or an on state) 430, and a system error state 440.

The state of the wireless power receiver may be determined based on the intensity of the output voltage at the rectifier end of the wireless power receiver (hereinafter, referred to as $V_{RECT}$ for the convenience of description).

The enable state 430 may be divided into an optimum voltage 431, a low voltage state 432, and a high voltage state 433 according to the value of $V_{RECT}$.

The wireless power receiver in the disable state 410 may be transited to the boot state 420 if the measured value of $V_{RECT}$ is greater than or equal to the predefined value of $V_{RECT\_BOOT}$.

In the boot state 420, the wireless power receiver may establish an out-of-band communication link with a wireless power transmitter, and may wait until the value of $V_{RECT}$ reaches the power required at the load stage.

Upon sensing that the value of $V_{RECT}$ has reached the power required at the load stage, the wireless power receiver in the boot state 420 may be transited to the enable state 430, and may begin charging.

The wireless power receiver in the enable state 430 may be transited to the boot state 420 upon sensing that charging is completed or interrupted.

In addition, the wireless power receiver in the enable state 430 may be transited to the system error state 440 when a predetermined system error is sensed. Here, the system error may include overvoltage, overcurrent, and overheating, as well as other predefined system error conditions.

In addition, the wireless power receiver in the enable state 430 may be transited to the disable state 610 if the value of $V_{RECT}$ falls below the value of $V_{RECT\_BOOT}$.

In addition, the wireless power receiver in the boot state 420 or the system error state 440 may be transited to the disable state 410 if the value of $V_{RECT}$ falls below the value of $V_{RECT\_BOOT}$.

Hereinafter, state transition of the wireless power receiver in the enable state 430 will be described in detail with reference to FIG. 5.

Figure 5:
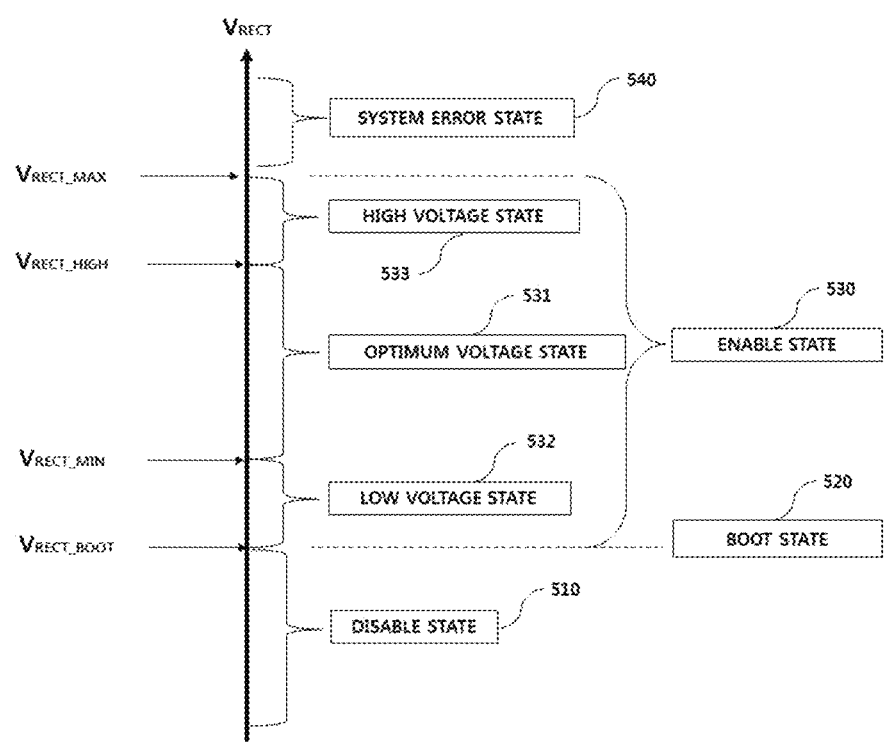
FIG. 5 is a view illustrating an operation region of a VRECT-based electromagnetic-resonance-type wireless power receiver according to an embodiment.

FIG. 5 is a view illustrating an operation region of a VRECT-based electromagnetic-resonance-type wireless power receiver according to an embodiment.

Referring to FIG. 5, if the value of $V_{RECT}$ is less than a predetermined value of $V_{RECT\_BOOT}$, the wireless power receiver is maintained in the disable state 510.

Thereafter, when the value of VRECT increases beyond $V_{RECT\_BOOT}$, the wireless power receiver may be transited to the boot state 520, and may broadcast an advertisement signal within a predetermined time. Thereafter, when the advertisement signal is sensed by the wireless power transmitter, the wireless power transmitter may transmit a predetermined connection request signal for establishing an out-of-band communication link to the wireless power receiver.

Once the out-of-band communication link is normally established and successfully registered, the wireless power receiver may wait until the value of $V_{RECT}$ reaches the minimum output voltage of the rectifier for normal charging (hereinafter, referred to as $V_{RECT\_MIN}$ for the convenience of description).

If the value of $V_{RECT}$ exceeds $V_{RECT\_MIN}$, the wireless power receiver may be transited from the boot state 520 to the enable state 530, and may begin charging the load.

If the value of $V_{RECT}$ in the enable state 730 exceeds a predetermined reference value $V_{RECT\_MAX}$ for determining overvoltage, the wireless power receiver may be transited from the enable state 530 to the system error state 540.

Referring to FIG. 5, the enable state 530 may be divided into a low voltage state 532, an optimum voltage state 531, and a high voltage state 533 according to the value of $V_{RECT}$.

The low voltage state 532 may refer to a state in which $V_{RECT\_BOOT} \leq V_{RECT} \leq V_{RECT\_MIN}$, the optimum voltage state 531 may refer to a state in which $V_{RECT\_MIN} < V_{RECT} \leq V_{RECT\_HIGH}$, and the high voltage state 533 may refer to a state in which $V_{RECT\_HIGH} < V_{RECT} \leq V_{RECT\_MAX}$.

In particular, the wireless power receiver that has been transited to the high voltage state 533 may suspend the operation of cutting off the power supplied to the load for a predetermined time (hereinafter, referred to as a high voltage state maintenance time for the convenience of description). The high voltage state maintenance time may be set in advance so as not to cause damage to the wireless power receiver and to the load in the high voltage state 533.

When the wireless power receiver is transited to the system error state 540, it may transmit a predetermined message indicating the occurrence of overvoltage to the wireless power transmitter through the out-of-band communication link within a predetermined time.

In addition, the wireless power receiver may control the voltage applied to the load using an overvoltage interruption means provided to prevent damage to the load due to the overvoltage in the system error state 540. Here, an ON/OFF switch and/or a Zener diode may be used as the overvoltage interruption means.

Although a method and means for coping with a system error in a wireless power receiver when overvoltage is generated and the wireless power receiver is transited to the system error state 540 have been described in the above embodiment, this is merely an embodiment. In another embodiment, the wireless power receiver may be transited to the system error state due to overheating, overcurrent, or the like.

For example, in the case in which the wireless power receiver is transited to the system error state due to overheating, the wireless power receiver may transmit a predetermined message indicating the occurrence of overheating to the wireless power transmitter. At this time, the wireless power receiver may drive a cooling fan or the like to reduce the internally generated heat.

In another embodiment, a wireless power receiver may receive wireless power in conjunction with a plurality of wireless power transmitters. In this case, the wireless power receiver may be transited to the system error state 540 upon determining that the wireless power transmitter from which the wireless power receiver is actually receiving wireless power is different from the wireless power transmitter with which the out-of-band communication link is established.

Hereinafter, a signaling procedure between a wireless power transmitter and a wireless power receiver according to an embodiment will be described in detail with reference to the accompanying drawings.

Figure 6:
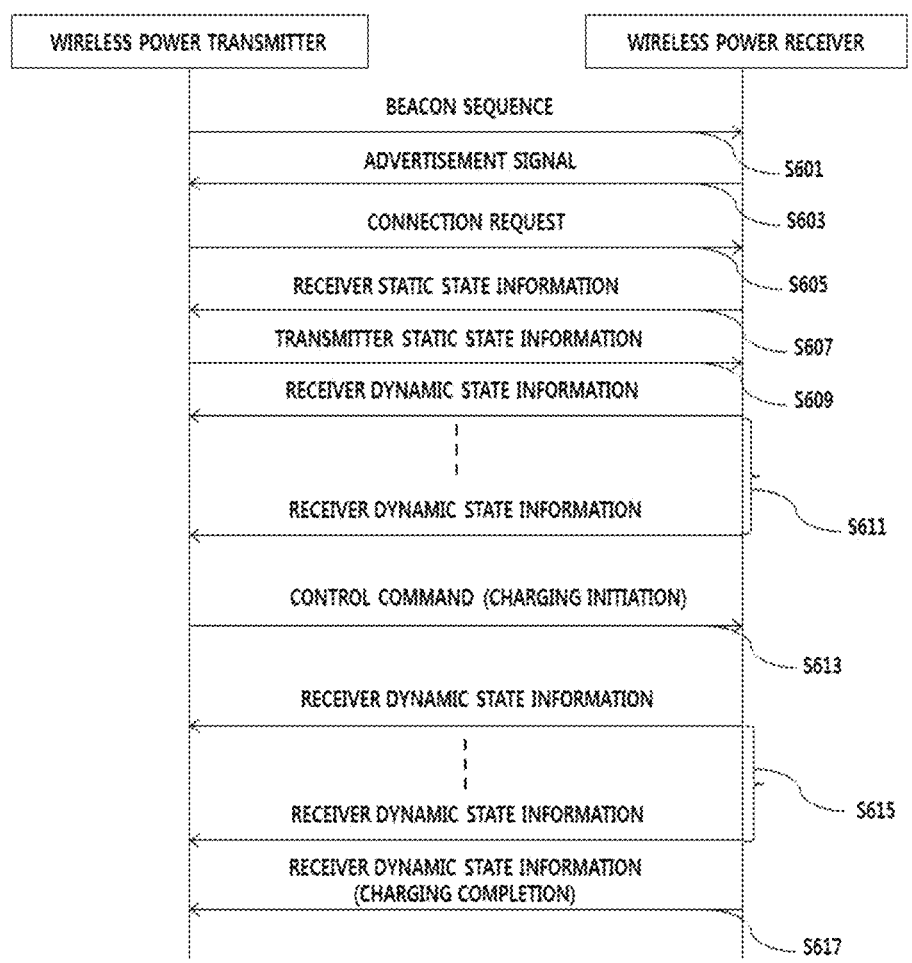
FIG. 6 is a flowchart illustrating an electromagnetic-resonance-type wireless charging procedure according to an embodiment.

FIG. 6 is a flowchart illustrating an electromagnetic-resonance-type wireless charging procedure according to an embodiment.

Referring to FIG. 6, when configuration of the wireless power transmitter, namely, booting, is completed according to the supply of power, the wireless power transmitter may generate a beacon sequence, and may transmit the beacon sequence through the transmission resonator (S601).

Upon sensing the beacon sequence, the wireless power receiver may broadcast an advertisement signal including identification information and characteristic information thereof (S603). Here, it should be noted that the advertisement signal can be repeatedly transmitted at predetermined cycles until a connection request signal, which will be described later, is received from the wireless power transmitter.

Upon receiving the advertisement signal, the wireless power transmitter may transmit a predetermined connection request signal for establishing an out-of-band communication link to the wireless power receiver (S605).

Upon receiving the connection request signal, the wireless power receiver may establish an out-of-band communication link, and may transmit static state information thereabout over the established out-of-band communication link (S607).

Here, the static state information of the wireless power receiver may include at least one of category information, hardware and software version information, maximum rectifier output power information, initial reference parameter information for power control, information about required voltage or power, information for identifying whether the power adjustment function is provided, information about a supported out-of-band communication scheme, information about a supported power control algorithm, or preferred rectifier-end voltage value information initially set in the wireless power receiver.

Upon receiving the static state information of the wireless power receiver, the wireless power transmitter may transmit the static state information thereof to the wireless power receiver over the out-of-band communication link (S609).

Here, the static state information of the wireless power transmitter may include at least one of transmitter output power information, class information, hardware and software version information, information about the maximum number of supported wireless power receivers, and/or information about the number of currently connected wireless power receivers.

Thereafter, the wireless power receiver may monitor its own real-time power reception state and charging state, and may transmit the dynamic state information to the wireless power transmitter periodically or when a specific event is generated (S611).

Here, the dynamic state information of the wireless power receiver may include at least one of information on the rectifier output voltage and current, information on voltage and current applied to the load, information on a measured internal temperature of the wireless power receiver, reference parameter change information for power control (the minimum rectified voltage value, the maximum rectified voltage value, and a changed value of an initially set preferred rectifier-end voltage), charging state information, system error information, or alarm information. The wireless power transmitter may perform power adjustment by changing the set value included in the existing static state information upon receiving the reference parameter change information for power control.

In addition, when sufficient power for charging the wireless power receiver is prepared, the wireless power transmitter may send a predetermined control command over the out-of-band communication link to control the wireless power receiver to start the charging operation (S613).

Thereafter, the wireless power transmitter may receive dynamic state information from the wireless power receiver and may dynamically control transmission power (S615).

In addition, when an internal system error is sensed or charging is completed, the wireless power receiver may transmit dynamic state information to the wireless power transmitter, including data for identifying the system error and/or data indicating that charging has been completed (S617). Here, the system error may include overcurrent, overvoltage, and overheating.

In another embodiment, when the currently available power cannot satisfy the power requirements of all of the connected wireless power receivers, the wireless power transmitter may redistribute the power to be transmitted to the respective wireless power receivers, and may transmit the redistributed power to the corresponding wireless power receiver through a predetermined control command.

In addition, when a new wireless power receiver is registered during wireless charging, the wireless power transmitter may redistribute the power to be received by the respective connected wireless power receivers based on the currently available power, and may transmit the same to the corresponding wireless power receivers through a predetermined control command.

In addition, when charging of a connected wireless power receiver is completed or the out-of-band communication link is released during wireless charging (for example, when the wireless power receiver is removed from the charging area), the wireless power transmitter may redistribute the power to be received by the other wireless power receivers, and may transmit the same to the corresponding wireless power receivers through a predetermined control command.

In addition, the wireless power transmitter may check, through a predetermined control procedure, whether a wireless power receiver is provided with a power control function. In this case, when the power redistribution situation occurs, the wireless power transmitter may perform power redistribution only for the wireless power receiver provided with the power control function.

For example, power redistribution may take place in the event that a valid advertisement signal is received from an unconnected wireless power receiver and thus a new wireless power receiver is added, a dynamic parameter indicating the current state of a connected wireless power receiver is received, it is recognized that there is no connected wireless power receiver anymore, charging of a connected wireless power receiver is completed, or an alarm (alert) message indicating a system error state of the connected wireless power receiver is received.

Here, the system error state may include an overvoltage state, an overcurrent state, an overheated state, and a network connection state.

For example, the wireless power transmitter may transmit power-redistribution-related information to the wireless power receivers through a predetermined control command.

Here, the power-redistribution-related information may include a command of the wireless power transmitter for power control.

For example, when a new wireless power receiver is registered, the wireless power transmitter may determine whether it can provide the amount of power required by the wireless power receiver based on the amount of available power of the wireless power transmitter. If the required amount of power exceeds the amount of available power as a result of the determination, the wireless power transmitter may check whether or not the corresponding wireless power receiver is provided with a power control function. If the corresponding wireless power receiver is provided with the power control function as a result of checking, the wireless power receiver may determine the amount of power that the wireless power receiver will receive in the range of the amount of available power, and may transmit the result of the determination to the wireless power receiver through a predetermined control command.

Of course, power redistribution may be performed within a range within which the wireless power transmitter and the wireless power receiver can operate normally and/or within a range within which normal charging is possible.

A wireless power receiver according to another embodiment may support a plurality of out-of-band communication schemes. If a currently established out-of-band communication link is to be changed to another scheme, the wireless power receiver may transmit a predetermined control signal to the wireless power transmitter to request a change in out-of-band communication. Upon receiving the out-of-band communication change request signal, the wireless power transmitter may release the currently established out-of-band communication link, and may establish a new out-of-band communication link in the out-of-band communication scheme requested by the wireless power receiver.

For example, out-of-band communication schemes applicable to embodiments may include at least one of NFC (Near Field Communication), RFID (Radio Frequency Identification), BLE (Bluetooth Low Energy), WCDMA (Wideband Code Division Multiple Access), LTE (Long Term Evolution)/LTE-Advanced, or Wi-Fi.

Figure 7:
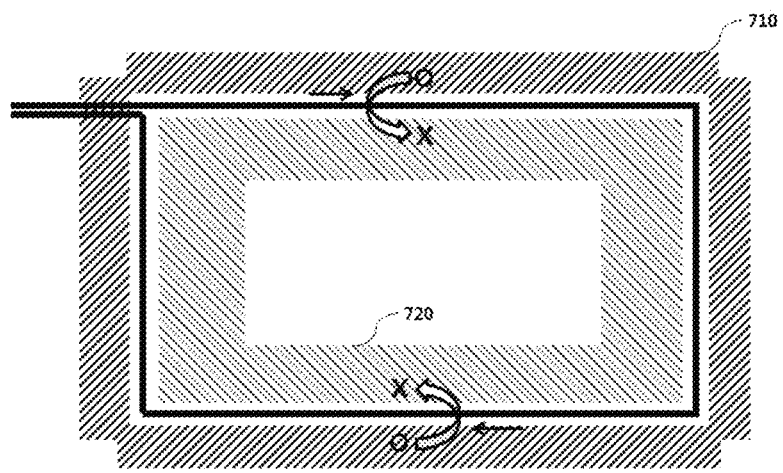
FIG. 7 is a view illustrating a magnetic field region in the case in which one electromagnetic-resonance-type wireless power transmission coil according to an embodiment is provided.

Meanwhile, in the case in which the wireless power transmitter includes a single wireless power transmission coil, the wireless power transmission coil may have the shape shown in FIG. 7.

FIG. 7 is a view illustrating a magnetic field region in the case in which one electromagnetic-resonance-type wireless power transmission coil according to an embodiment is provided.

Referring to FIG. 7, the wireless power transmission coil, which has a single loop shape, may be divided into an inner coil region and an outer coil region. Current flowing in the coil may generate a magnetic field in the form of concentric circles about the coil. The arrows shown in FIG. 7 indicate the direction of the current.

In the case in which a single loop-shaped coil is used, a wireless power transmission region based on the region of a magnetic field generated by the coil may be divided into an outer region 710 and an inner region 720.

The wireless power transmission region may be determined based on the region of the magnetic field generated by the current in the outer coil region, and the size of a charging pad of a wireless charging device including a wireless power transmitter may be determined based on the region of the magnetic field.

Meanwhile, a region in which wireless power transmission is impossible (ordinarily, a dead zone) may be formed in the vicinity of the wireless power transmission coil. The direction of a magnetic field generated by a wireless power reception coil is opposite the direction of the magnetic field generated by the wireless power transmission coil, whereby the magnetic fields generated by the wireless power transmission and reception coils are offset. As a result, sufficient coupling of the magnetic fields between the transmission and reception coils is not achieved, whereby wireless power transmission is impossible in the vicinity of the coil.

The problem that may be caused in the case in which a single wireless power transmission coil is provided, as shown in FIG. 7, is that the amount of magnetic flux in the center of the wireless power transmission coil is very small, whereby the amount of wireless power that is transmitted may be small. A method for solving this problem and limitations thereof will be described with reference to FIG. 8.

Figure 8:
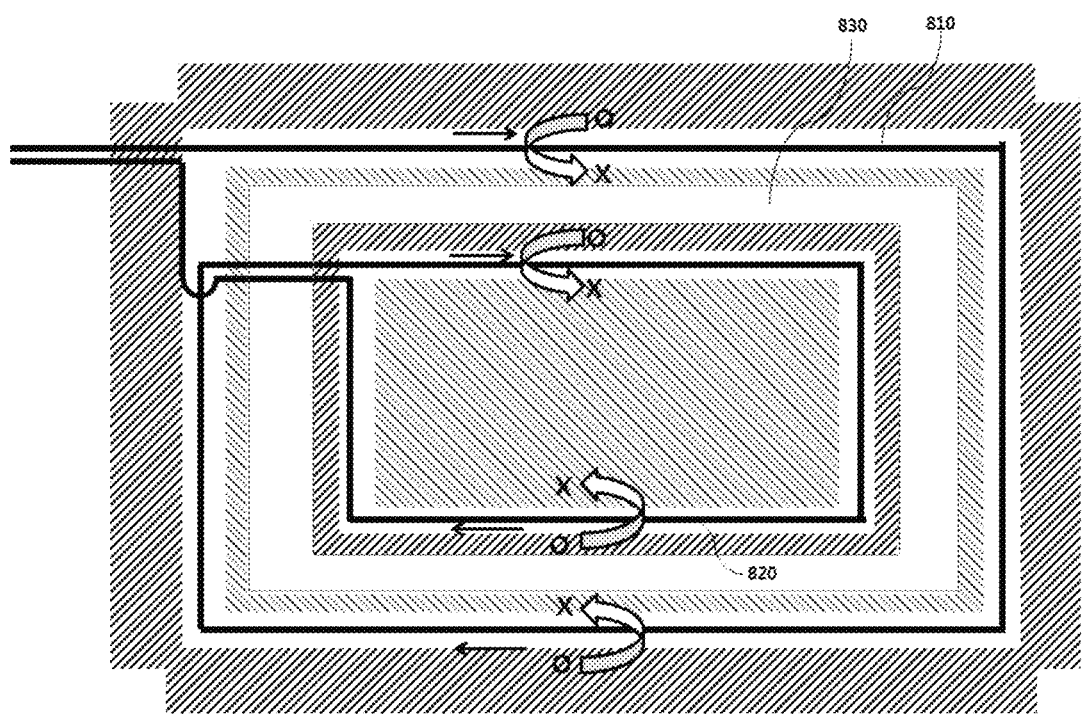
FIG. 8 is a view illustrating a region in which magnetic fields are offset in the case in which two electromagnetic-resonance-type wireless power transmission coils according to an embodiment are provided.

In FIG. 8, an arrangement of a wireless power transmission coil that is capable of increasing the amount of magnetic flux in the center of the coil is suggested. However, the arrangement of the coil suggested in FIG. 8 cause another problem. In order to solve this problem, a method of optimally arranging a wireless power transmission coil will be described with reference to FIGS. 9 and 10.

FIG. 8 is a view illustrating a region in which magnetic fields are offset in the case in which two electromagnetic-resonance-type wireless power transmission coils according to an embodiment are provided.

Referring to FIG. 8, in order to increase the amount of magnetic flux in the center of a wireless power transmission coil, another coil may be further disposed inside the wireless power transmission coil.

In the case in which a plurality of wireless power transmission coils is used instead of a single wireless power transmission coil, the size of a charging area, in which a magnetic field may be generated, may be increased, and therefore a plurality of portable terminals may be charged at once. In addition, the problem in which a region in which wireless power transmission is impossible (ordinarily, a dead zone) is formed in the vicinity of the wireless power transmission coil may be solved using a plurality of wireless power transmission coils, and the amount of magnetic flux in the center of the wireless power transmission coil may be increased.

Meanwhile, in the case in which the coils are arranged as shown in FIG. 8, the amount of magnetic flux in the center of each coil may be increased. However, magnetic fields are offset in a region 830 between the outer coil 810 and the inner coil 820, whereby a wireless power receiver located in the region 830 may not receive power.

The direction of a magnetic field generated by current flowing in a coil is the direction in which the four fingers of the right hand are bent when the thumb is directed in the direction in which the current flows according to Ampere's Law.

When the direction of current flowing in the outer coil 810 is the arrow direction (the clockwise direction), the magnetic field generated by the outer coil 810 moves upwards vertically in the outer region of the outer coil 810, is wound in the form of concentric circles about the coil, and moves downwards vertically in the outer region.

When the direction of current flowing in the inner coil 820 is identical to the direction of current flowing in the outer coil (the clockwise direction), the magnetic field generated by the inner coil 820 moves upwards vertically in the outer region of the inner coil 820.

At this time, the magnetic field moving downwards in the inner region of the outer coil 810 and the magnetic field moving upwards in the outer region of the inner coil 820 are offset, whereby a dead zone, in which the magnetic field is weak and thus wireless power transmission is impossible, may be formed in the region 830.

This problem is caused since the directions of current flowing in the outer coil 810 and the inner coil 820 are the same. Hereinafter, a method of arranging the outer coil 810 and the inner coil 820 such that the directions of current flowing in the outer coil 810 and the inner coil 820 are opposite each other will be described with reference to FIGS. 9 and 10.

Figure 9:
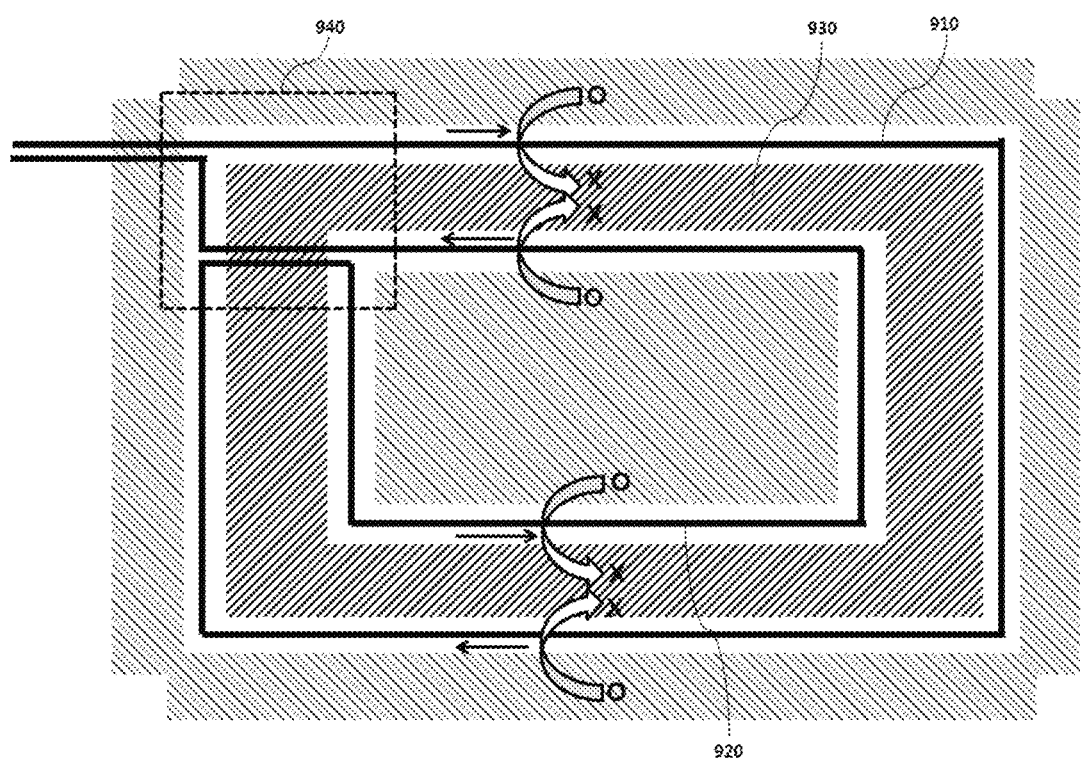
FIG. 9 is a view illustrating a magnetic field region in the case in which a plurality of electromagnetic-resonance-type wireless power transmission coils according to an embodiment is connected in series.

FIG. 9 is a view illustrating a magnetic field region in the case in which a plurality of electromagnetic-resonance-type wireless power transmission coils according to an embodiment is connected in series.

Referring to FIG. 9, the direction of current flowing in an outer coil 910 (the clockwise direction) and the direction of current flowing in an inner coil 920 (the counterclockwise direction) are opposite each other.

In the case in which the coils are arranged as described above, the magnetic field generated by the current flowing in the outer coil 910 moves downwards vertically in the inner region thereof, and the magnetic field generated by the current flowing in the inner coil 920 moves downwards vertically in the outer region thereof according to Ampere's Law. That is, the directions of the magnetic fields are the same.

Unlike FIG. 8, therefore, the magnetic field generated by the outer coil 910 and the magnetic field generated by the inner coil 920 move in the same vertical direction in a region between the outer coil 910 and the inner coil 920, whereby the magnetic fields generated by the coils are not offset. Consequently, wireless power transmission may be smoothly performed in the region between the outer coil 910 and the inner coil 920.

The outer coil 910 and the inner coil 920 may form a single closed-loop shape. In the closed-loop shape, the coils may be connected in series such that the same current flows.

In an embodiment, the loop shape of the outer coil 910 may be referred to as a "first loop shape," and the loop shape of the inner coil 920 may be referred to as a "second loop shape." Each of the first loop shape and the second loop shape is a general loop shape, is not necessarily a closed loop, and may be partially open.

In the case in which a connection unit 940 has a series connection structure, the outer coil 910 and the inner coil 920 may form a single closed-loop shape. In the case in which the outer coil 910 and the inner coil 920 are connected in series, the magnitudes of the current flowing in the outer coil 910 and the inner coil 920 may be the same.

In an embodiment, the connection unit 940 may interconnect the outer coil 910 and the inner coil 920 in series. Structurally, the connection unit 940 may interconnect the first end of the outer coil 910 and the power conversion unit, may interconnect the second end of the outer coil and the first end of the inner coil 920, and may interconnect the second end of the inner coil 920 and the power conversion unit.

Through the connection structure of the connection unit 940 described above, current flowing in the outer coil 910 flows from the first end of the outer coil 910 to the second end of the outer coil 910, and current flowing in the inner coil 920 flows from the first end of the inner coil 920 to the second end of the inner coil. Accordingly, the first end of the outer coil 910 and the second end of the inner coil 920 may be disposed so as to be adjacent to each other.

Figure 10:
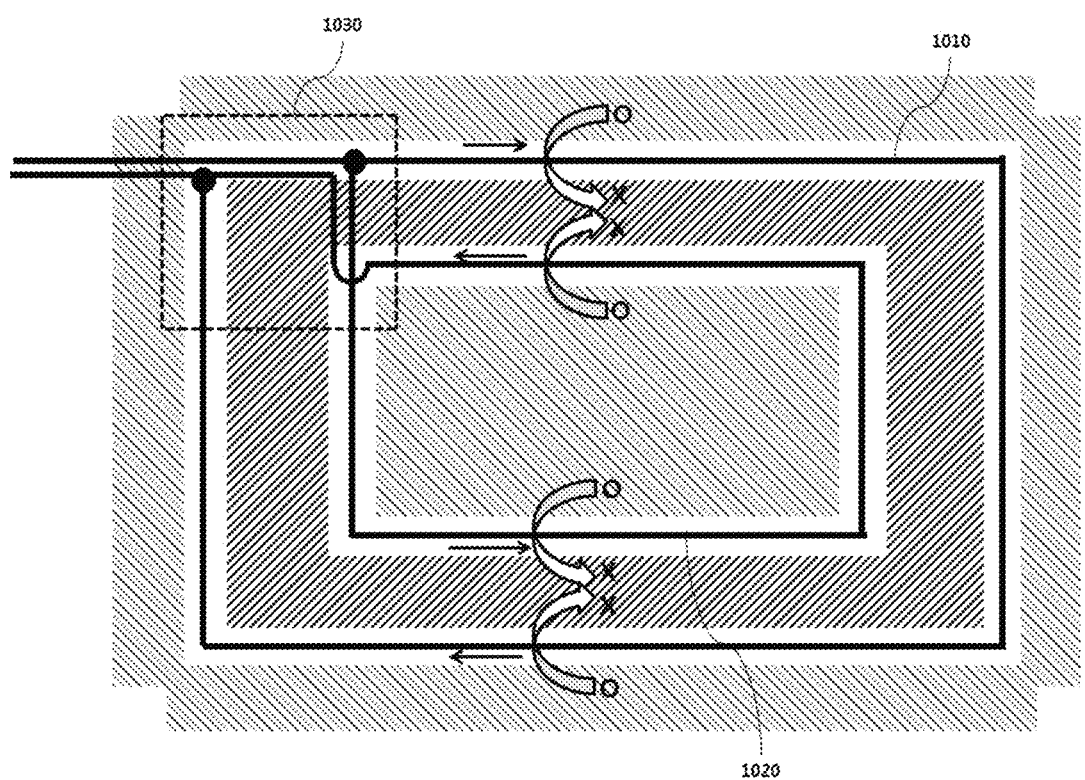
FIG. 10 is a view illustrating a magnetic field region in the case in which a plurality of electromagnetic-resonance-type wireless power transmission coils according to an embodiment is connected in parallel.

In another embodiment, the outer coil 910 and the inner coil 920 may be connected in parallel, as shown in FIG. 10, in addition to the series-connection-type connection unit 940.

FIG. 10 is a view illustrating a magnetic field region in the case in which a plurality of electromagnetic-resonance-type wireless power transmission coils according to an embodiment is connected in parallel.

FIG. 10 is different from FIG. 9 in terms of the structure of a connection unit 1030 for interconnecting an outer coil 1010 and an inner coil 1020. The connection unit 1030 may have a parallel connection structure, by which the voltage applied to the outer coil 1010 and the voltage applied to the inner coil 1020 may be the same. That is, in FIGS. 9 and 10, the difference between the connection unit 940 and the connection unit 1030 is merely a difference of design, in which the directions of current flowing in the outer coil 1010 and the inner coil 1020 are opposite each other.

In an embodiment, the connection unit 1030 may interconnect the first and second ends of the outer coil 1010 and the power conversion unit, may interconnect the first end of the inner coil 1020 and the first end of the outer coil 1010, and may interconnect the second end of the inner coil and the power conversion unit.

Through the connection structure of the connection unit 940 described above, current flowing in the outer coil 1010 flows from the first end of the outer coil 1010 to the second end of the outer coil 1010, and current flowing in the inner coil 1020 flows from the first end of the inner coil 1020 to the second end of the inner coil 1020.

In the case in which the connection unit 1030 has a parallel connection structure, the magnitudes of current flowing in the outer coil 1010 and the inner coil 1020 may be different from each other, and the regions and intensities of magnetic fields generated by the respective coils may also be different from each other.

In an embodiment, the magnitude of current flowing in the inner coil 1020 may be greater than that of current flowing in the outer coil 1010, and the distance between the outer coil 1010 and the inner coil 1020 may be adjusted in consideration thereof.

The arrangement of the distance between the outer coil 1010 and the inner coil 1020 and the distance between a pair of outer and inner coils 1010 and 1020 and another pair of outer and inner coils 1010 and 1020 will be described with reference to FIG. 11.

Figure 11:
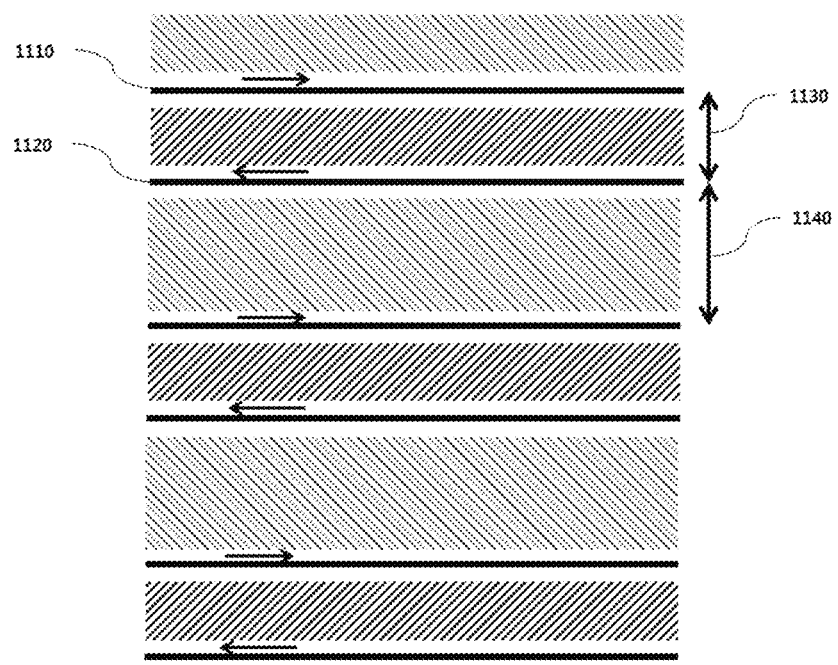
FIG. 11 is a view illustrating an arrangement distance in the case in which a plurality of pairs of electromagnetic-resonance-type wireless power transmission coils according to an embodiment is wound.

FIG. 11 is a view illustrating an arrangement distance in the case in which a plurality of pairs of electromagnetic-resonance-type wireless power transmission coils according to an embodiment is wound.

Referring to FIG. 11, an outer coil 1110 and an inner coil 1120 may form a coil pair. The distance between the outer coil 1110 and the inner coil 1120 is referred to as a first distance 1130. In the case in which a plurality of coil pairs is wound, the distance between neighboring coil pairs is referred to as a second distance 1140.

The arrows shown in FIG. 11 indicate the directions of current. The directions of current flowing in the coils are set such that the direction of current flowing in one coil is opposite the direction of current flowing in another adjacent coil.

The first distance and the second distance are arranged to prevent interference between magnetic fields generated by the coils, i.e. to prevent offset of magnetic fields.

Since the intensity of a magnetic field increases when the magnitude of current flowing in a coil increases according to the Biot-Savart Law, the first distance between the outer coil 1110 and the inner coil 1120 may be determined depending on the magnitude of current flowing in the coil.

In an embodiment, a reference distance based on reference current may be experimentally determined, and the first distance may become larger than the reference distance as the maximum magnitude of current supplied to coils increases.

Meanwhile, an N-th pair of outer and inner coils 1110 and 1120 may be wound, and in the case in which an (N+1)-th coil pair is wound, the second distance between the coil pairs may also be determined based on the maximum magnitude of current flowing in the coils.

For the second distance, a reference distance based on a reference current at which interference between magnetic fields is minimized may also be experimentally determined, and the second distance may become larger than the reference distance as the maximum magnitude of current supplied to the coils increases.

The method according to the embodiments described above may be implemented as a program to be executed on a computer and stored in a computer-readable recording medium. Examples of the computer-readable recording medium include ROM, RAM, CD-ROM, magnetic tapes, floppy disks, and optical data storage devices, and also include carrier-wave-type implementation (e.g., transmission over the Internet).

The computer-readable recording medium may be distributed to a computer system connected over a network, and computer-readable code may be stored and executed thereon in a distributed manner. Functional programs, code, and code segments for implementing the method described above may be easily inferred by programmers in the art to which the embodiments pertain.

It will be apparent to those skilled in the art that the present disclosure may be embodied in specific forms other than those set forth herein without departing from the spirit and essential characteristics of the present disclosure.

Therefore, the above embodiments should be construed in all aspects as illustrative and not restrictive. The scope of the disclosure should be determined by the appended claims and their legal equivalents, and all changes coming within the meaning and equivalency range of the appended claims are intended to be embraced therein.

INDUSTRIAL APPLICABILITY

A wireless power transmitter according to an embodiment may be used as a wireless power transmitter including a plurality of wireless power transmission coils that is effectively arranged so as to transmit uniform power to a wireless power receiver.

SEQUENCE LIST FREE TEXT

100: Wireless power transmitter
110: Power supplier
120: Power conversion unit
130: Matching circuit
140: Transmission resonator
150: Main controller
160: Communication unit
200: Wireless power receiver
210: Reception resonator
220: Rectifier
230: DC-DC converter
240: Load
250: Main controller
260: Communication unit
201: Matching circuit
202: Transmission resonator coil
203: Reception resonator coil
204: Matching circuit
211: L1
212: L2

The invention claimed is:

1. A wireless power transmitter comprising:
a power conversion unit comprising a converter for converting voltage received from a power supplier into a specific voltage;
a power transmission unit comprising a wireless power transmission coil for wirelessly transmitting power using a specific resonance frequency based on the specific voltage from the power conversion unit, wherein an outermost portion of the wireless power transmission coil is a first single loop and an innermost portion of the wireless power transmission coil is a second single loop;
a communication unit configured to perform data communication with a wireless power receiver;
a controller configured to control the power conversion unit, the power transmission unit, and the communication unit;
a connection unit connecting the first single loop and the second single loop,
wherein the connection unit includes:
a first end of the first single loop connected to the power conversion unit; and
a second end of the second single loop connected to the power conversion unit,
wherein a second end of the first single loop is connected to a first end of the second single loop,
wherein a direction of current flowing in the first single loop is opposite a direction of current flowing in the second single loop, and
wherein a direction of a magnetic field generated by the current flowing through the first single loop and a direction of a magnetic field generated by the current flowing through the second single loop are the same direction in a first region between the first single loop and the second single loop.

2. The wireless power transmitter according to claim 1, wherein
the first single loop and the second single loop, which is adjacent to the first single loop, are spaced apart from each other by a first distance, and
the first distance is determined based on a magnitude of current flowing in the power transmission unit.

3. The wireless power transmitter according to claim 2, wherein the first single loop and the second single loop are connected in parallel.

4. The wireless power transmitter according to claim 1, wherein
- the current flowing in the first single loop flows from the first end of the first single loop to the second end of the first single loop, and
- the current flowing in the second single loop flows from the first end of the second single loop to the second end of the second single loop.

5. The wireless power transmitter according to claim 4, wherein the first end of the first single loop and the second end of the second single loop are disposed so as to be adjacent to each other.

6. The wireless power transmitter according to claim 1, wherein the connection unit further comprises:

- a branch of the first single loop extending horizontally;
- a first branch of the second single loop extending horizontally and parallel with the branch of the first single loop;
- a second branch of the second single loop extending vertically and perpendicular with the branch of the first single loop; and
- a horizontal branch extending horizontally and connecting the second end of the first single loop with the first end of the second single loop.

7. The wireless power transmitter according to claim 6, wherein the horizontal branch of the connecting unit is spaced a predetermined distance from the first branch of the second single loop, and
- wherein the predetermined distance is less than a distance between the first single loop and the second single loop.

\* \* \* \* \*